United States Patent
Vesanen (10) Patent No.: US 10,421,144 B2
(45) Date of Patent: Sep. 24, 2019

(54) WELDING WIRE FEEDER DEVICE

(71) Applicant: ESAB AB, Gothenburg (SE)

(72) Inventor: Jorma Kalevi Vesanen, Gothenburg (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 15/668,014

(22) Filed: Aug. 3, 2017

(65) Prior Publication Data

US 2019/0039164 A1    Feb. 7, 2019

(51) Int. Cl.
  *B23K 9/133*   (2006.01)
  *B65H 51/10*   (2006.01)
  *B65H 51/18*   (2006.01)

(52) U.S. Cl.
  CPC .......... *B23K 9/1336* (2013.01); *B65H 51/105* (2013.01); *B65H 51/18* (2013.01)

(58) Field of Classification Search
  CPC .......... B65H 51/18; B65H 2301/44338; B65H 2301/4471; B65H 2301/44712; B65H 2405/50; B65H 2405/57; B65H 2405/575; B65H 2405/573; B65H 2405/583; B65H 2405/5831; B65H 51/1058; B65H 51/10; B65H 51/105; B23K 9/13; B23K 9/1336; B65G 17/326; B65G 2812/02346; B65G 15/14; B65G 15/16; F16L 1/23
  USPC ... 198/626.1–626.6, 867.06, 867.07, 867.11, 198/803.8, 803.9, 817, 819
  See application file for complete search history.

(56) References Cited

U.S. PATENT DOCUMENTS

| | | | |
|---|---|---|---|
| 1,904,885 A * | 4/1933 | Seeley | B65H 51/14 15/104.33 |
| 2,046,997 A | 7/1936 | Boddy et al. | |
| 2,679,924 A | 6/1954 | Powell | |
| 2,884,120 A * | 4/1959 | Bruestle | B21C 19/00 226/172 |
| 2,915,171 A | 12/1959 | Peck | |
| 3,056,535 A | 10/1962 | Baugh et al. | |
| 3,103,306 A | 9/1963 | Eldik | |
| 3,143,269 A | 8/1964 | Eldik | |

(Continued)

FOREIGN PATENT DOCUMENTS

EP    0442037 A1    8/1991

OTHER PUBLICATIONS

Notification of Transmittal of International Search Report and Written Opinion including International Search Report and Written Opinion for PCT/IB2018/055558 dated Nov. 27, 2018, 14 pages.

*Primary Examiner* — Michael C McCullough
(74) *Attorney, Agent, or Firm* — Edell, Shapiro & Finnan, LLC (57) ABSTRACT

A wire feeder device for feeding a welding wire in a feeding direction is disclosed. The wire feeder device includes one or more roller chains and a plurality of first and second gripper members. The gripper members are movable from an open position to a closed position to contact and grip the welding wire. In use, the first and second gripper members are longitudinally movable with the roller chain(s) so that the welding wire is pulled along a substantially linear path. The first and second gripper members may be orientated in a vertical (i.e., coplanar) orientation or a horizontal, lateral orientation. The gripper members may include a built-in centering function to center a position of the welding wire.

18 Claims, 9 Drawing Sheets

(56) References Cited

U.S. PATENT DOCUMENTS

| | | | |
|---|---|---|---|
| 3,251,523 A | | 5/1966 | Reifenhauser et al. |
| 3,351,034 A | * | 11/1967 | Grek .................. B21C 37/0807 |
| | | | 226/173 |
| 4,469,267 A | | 9/1984 | Franchuk et al. |
| 4,476,754 A | | 10/1984 | Ducret |
| 4,741,468 A | * | 5/1988 | Weil .................... B23K 37/053 |
| | | | 228/16 |
| 6,199,829 B1 | * | 3/2001 | Brown .................. B65H 51/14 |
| | | | 104/112 |

* cited by examiner

WELDING WIRE FEEDER DEVICE

FIELD OF THE DISCLOSURE

Embodiments of the present disclosure relate generally to welding wire feeders, and in particular, to a caterpillar style wire feeder.

BACKGROUND OF THE DISCLOSURE

Welding is a widely known process. Generally speaking, welding may be performed manually or, in some applications, it may be automated. Welding operations rely on a variety of types of equipment to ensure the supply of welding consumables (e.g., wire feed, shielding gas, etc.) is provided to the weld joint in an appropriate amount at the desired time. For example, a wire feeder is often used to provide welding wire at a desired feed rate to a welding torch.

Wire feeders facilitate the feeding of welding wire from a wire spool or drum to a welding torch at a desired wire feed rate. In general, prior art wire feeders incorporate at least one pair of rotating wire feed rollers to feed the wire. In these systems, the needed pulling friction between the rollers and the wire may be created by using one or both rollers to apply a squeezing pressure to the wire between the pair of rollers. In addition, some known wire feeders have grooves formed in one or both rollers to maintain the wire in position and/or to enhance or control the frictional forces between the wire and rollers.

Wire feeders of the type described above have a number of shortcomings. For example, long set up times are common as a user typically needs to open an access panel, and then open the feed mechanism to initially thread the wire through the wire feeder. In addition, the user often needs to change the rollers and wire guides when switching between welding wires of different diameters. In addition to the time it takes to switch the rollers/guides, this also introduces the possibility that the user may use the wrong set of rollers and/or guides. The user may also need to adjust the pressure of the feed rollers, which introduces the possibility that the user may incorrectly set the roller pressure, resulting in an undesirably high degree of wire deformation due to the high pressure. In addition, the mechanism may become clogged as a result of a peeled wire caused by too much pressure and/or nonalignment in the mechanism, and unreliable feeding of the wire due to wire slippage (contact point friction). Further, safety issues (e.g., finger pinching and the like) may be a concern as a user accesses and opens the mechanism. Furthermore, prior art wire feeders that rely on a pair of rotating rollers generally require a high level of maintenance, which results in high maintenance costs associated with buying and stocking spare parts, and which increases the potential for improper maintenance practices.

One solution that has been used to overcome some of these shortcomings, has been to incorporate a second pair of rotating rollers immediately after the first pair of rotating rollers. In use, movement of the first and second pair of rotating rollers is synchronized. By adding a second pair of rollers, the relatively high surface pressure on the wire may be halved. Unfortunately, adding a second pair of rollers often creates new issues. For example, with the introduction of a second pair of rollers, an increased risk exists for tangling of the wire, especially between the two pairs of rotating rollers. Also there is an increased risk of "shaving," which is the tearing-away of material from the surface of the wire due to misalignment between the grooves formed in the rotating rollers and associated nozzles, and due to slipping of the wire relative to the rotating rollers. This can increase the possibility of clogging of the feed mechanism, the torch cable liner, and the torch.

In view of the foregoing, it would be desirable to provide a wire feeder device for welding that overcomes the shortcomings associated with prior art devices.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments of the present disclosure are generally directed to a wire feeder device. One exemplary embodiment of the wire feeder device for feeding a welding wire in a feeding direction from an input end to an output end may include at least one gripper assembly for contacting and feeding the welding wire. The gripper assembling includes a roller chain, and first and second sprockets operatively coupled to the roller chain so that rotation of the first and second sprockets causes the roller chain to rotate, and a plurality of first and second gripper members. The first and second gripper members are positioned on opposite sides of the welding wire and are movable from an open position to a closed position to contact and grip the welding wire. The first and second gripper members are longitudinally movable along a substantially linear path with the rotating roller chain so that the welding wire is moved from the input end to the output end.

The first and second gripper members may include a centering feature to positionally center the welding wire substantially parallel to the substantially linear path of the first and second gripper members. The first and second gripper members may each include a projection and a cutout, the projection of the first gripper member being receivable within the cutout of the second gripper member, and the projection of the second gripper member being receivable within the cutout of the first gripper member. The projections may include converging transversely sloped surfaces that angle from a high point adjacent an outer side surface of the gripper member to a lower point or nadir adjacent a centerline of the gripper member. Each of the projections may include a notch at the nadir for contacting an outer surface of the welding wire. The notch may have an arcuate, typically semi-circular shape. Since the projection of each gripper member is received in the cutout of the other gripper member, the notches formed in first and second gripper members are longitudinally offset such that they contact the welding wire at different but longitudinally adjacent points along the wire. This offset minimizes compression and potential distortion of the welding wire. The first and second gripper members may be made from a flexible material. Each gripper member may include a spring or other biasing member for biasing the first and second gripper members transversely of the welding wire to the closed position.

The roller chain may include a plurality of individual chain links coupled to one another. Each of the plurality of first and second gripper members may have a length in the direction of wire movement substantially corresponding to the length of an individual chain link to provide an increased contact area between the first and second gripper members and the welding wire. Rotation of the roller chain causes the first and second gripper members to move from the open position to the closed position, and subsequently from the closed position to the open position.

The aforesaid at least one gripper assembly may be first and second gripper assemblies. The first plurality of gripper members may be coupled to the roller chain of the first gripper assembly while the second plurality of gripper members may be coupled to the roller chain of the second gripper assembly. The first and second gripper assemblies may be orientated coplanar with respect to one another (i.e., vertically adjacent one another). In use, the respective roller chains of the first and second gripper assemblies may be configured to rotate in opposite directions such that the gripper assemblies move along a substantially longitudinal path in the same direction at their engaged portions to effect a pulling action on the welding wire. In this arrangement the first and second gripper members located on the first and second gripper assemblies, respectively, move vertically from the open position to the closed position adjacent the input end of the assembly, and the first and second gripper assemblies move from the closed position to the open position adjacent the output end of the assembly. Moving the first and second gripper members from the open position to the closed position causes the first and second gripper members to grip the welding wire therebetween so that the welding wire is movable, i.e., pulled, from the input end to the output end.

The roller chain of the first gripper assembly and the roller chain of the second gripper assembly may each include a plurality of individual chain links coupled to one another, each of the first and second gripper members having a size substantially corresponding to the size of each individual link so that one of the plurality of first gripper members can be coupled to a corresponding one of the individual links of the roller chain of the first gripper assembly, and so that one of the plurality of second gripper members can be coupled to a corresponding one of the individual links of the roller chain of the second gripper assembly. The first and second gripper members may each include a biasing member for supplying a biasing force away from each individual link coupled thereto.

The at least one gripper assembly may alternatively be a single gripper assembly. The roller chain may include a plurality of individual chain links coupled to one another to form a chain, each individual link of the roller chain be associated with one of the plurality of first gripper members and one of the plurality of second gripper members. The first and second gripper members may be disposed in adjacent planes, i.e., laterally, rather than vertically, adjacent, or orientated in a side-by-side relationship on each individual link. In use, rotation of the roller chain causes the first and second gripper members to move laterally from the open position to the closed position, and subsequently from the closed position to the open position. Moving the first and second gripper members from the open position to the closed position causes the first and second gripper members to grip the welding wire therebetween in the manner described above, the first and second gripper members moving from the open position to the closed position adjacent the input end. Moving the first and second gripper members from the closed position to the open position causes the first and second gripper members to disengage from the welding wire, the first and second gripper members moving from the closed position to the open position adjacent the output end.

The gripper assembly may include a guide device for moving the first and second gripper members from the closed position to the open position. The first and second roller chains may include a biasing member for moving the first and second gripper members from the open position to the closed position.

BRIEF DESCRIPTION OF THE DRAWINGS

By way of example, specific embodiments of the disclosed device will now be described with reference to the accompanying drawings, in which.

DETAILED DESCRIPTION OF THE DISCLOSURE

A device in accordance with the present disclosure will now be described more fully hereinafter with reference to the accompanying drawings, in which preferred embodiments of the device are shown. The disclosed device, however, may be embodied in many different forms and should not be construed as being limited to the embodiments set forth herein. Rather, these embodiments are provided so that this disclosure will be thorough and complete, and will fully convey the scope of the device to those skilled in the art. In the drawings, like numbers refer to like elements throughout.

Referring to FIGS. 1-4D, an exemplary embodiment of a welding device 50 incorporating a wire feeder device 100 for contacting and feeding a welding wire 60 (shown in FIG. 2) in accordance with the present disclosure is shown. While the present disclosure is illustrated and described in terms of feeding a welding wire in a welding device, it is contemplated that the present disclosure has applicability beyond the welding industry and can be used in any industry where contacting and feeding a longitudinal member is required.

Figure 1:
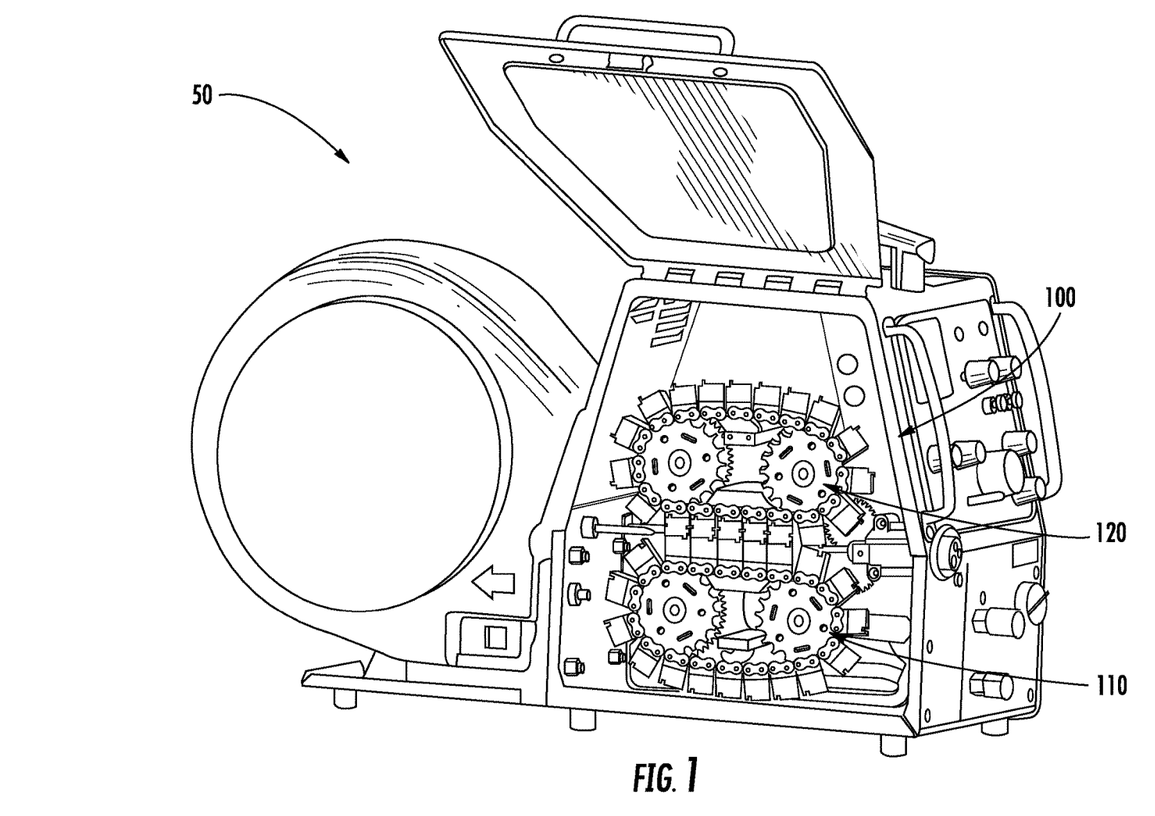
FIG. 1 is a perspective view illustrating an exemplary welding arrangement including an exemplary wire feeder device according to the present disclosure.
Figure 2:
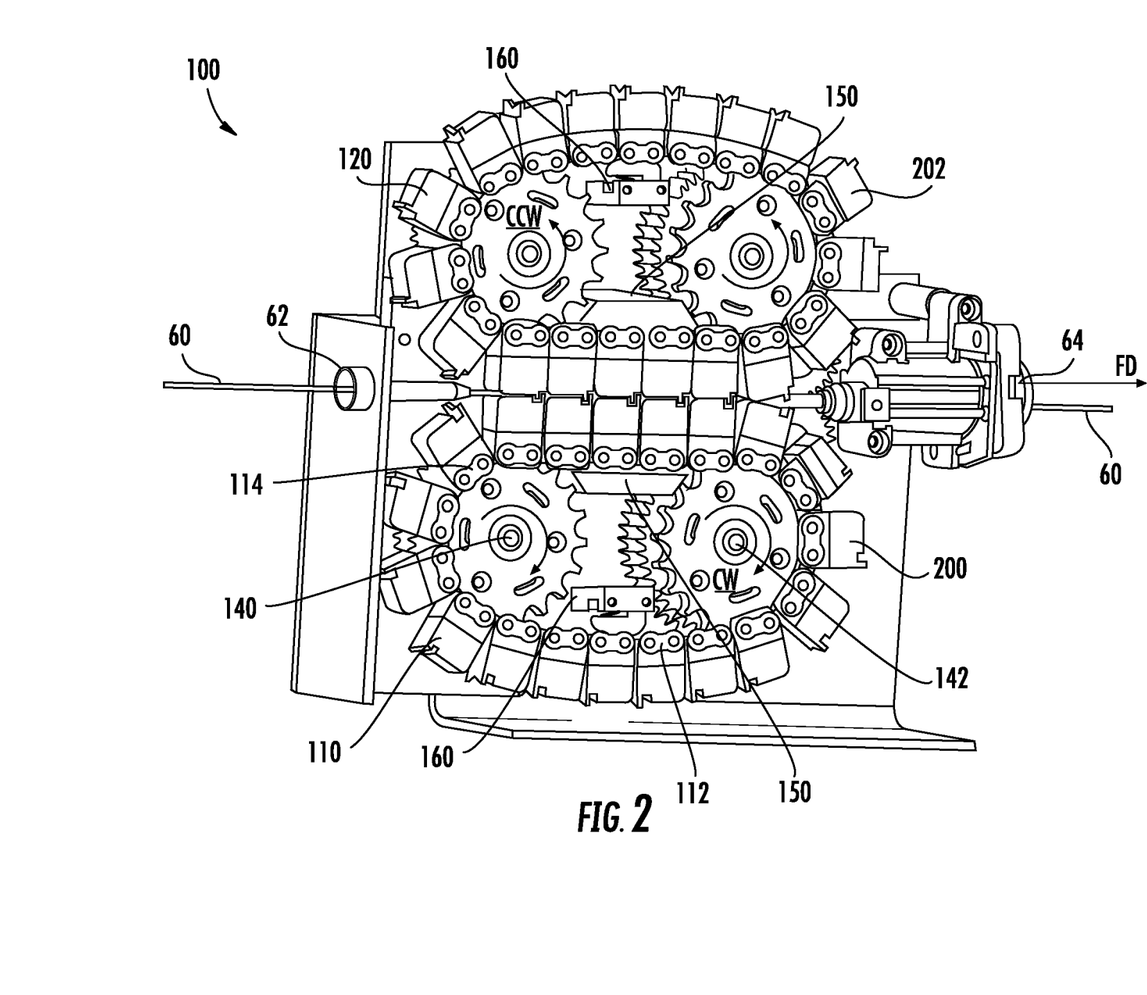
FIG. 2 is a side, perspective view of the exemplary wire feeder device shown in FIG. 1.

Referring to FIG. 2, the wire feeder device 100 may include first and second gripper assemblies 110, 120 for contacting and feeding the welding wire 60. As shown, the first and second gripper assemblies 110, 120 may be orientated so that the second gripper assembly 120 is located above the first gripper assembly 110, in a substantially coplanar or vertically adjacent orientation. In use, the first and second gripper assemblies 110, 120 may rotate in opposite directions so that the first and second gripper members 200, 202 located on the first and second gripper assemblies 110, 120, respectively, move from an open position to a closed position, and then, after traversing a substantially linear path in the closed position, move from the closed position to the open position, so that the first and second gripper members 200, 202 move vertically into and out of contact with respect to one another. That is, as the first and second gripper assemblies 110, 120 rotate in opposite directions, the first and second gripper members 200, 202 come into contact with one another (e.g., assuming a closed position), and engage the welding wire 60 located therebetween, adjacent the input end 62 of the welding device 50. As the first and second gripper assemblies 110, 120 rotate further, they disengage from each other (e.g., assuming an open position), and thus disengage from the welding wire 60 adjacent the output end 64 of the device 100. In this manner, the first and second gripper members 200, 202 grip the welding wire 60 therebetween and translate the wire along a substantially linear path. Because the first and second gripper members 200, 202 are coupled to the rotating first and second gripper assemblies 110, 120, respectively, the welding wire 60 is thereby fed (e.g., moved) from the input end 62 to the output end 64 of the welding device 50. As such, rotation of the first and second gripper assemblies 110, 120 causes the welding wire 60 to be gripped between the first and second gripper members 200, 202, and for the first and second gripper members 200, 202, along with the welding wire 60 located therebetween, to move in the feed direction FD.

As the first and second gripper assemblies 110, 120 are substantially similar, only the first gripper assembly 110 will be described in detail. It will be appreciated, however, that the second gripper assembly 112 may include any or all of the features described in relation to the first gripper assembly 110, and thus, discussion of the second gripper assembly 120 will be omitted except for any distinctions between the two (for example, differences in the configurations of the first and second gripper members 200, 202).

The first gripper assembly 110 may include a roller chain, an endless track belt, a belt, or the like (collectively referred to herein as a roller chain 112). As shown, the roller chain 112 may be formed from a plurality of individual chain links 114 coupled together to be movable relative to one another and to form an endless chain loop. In use, the roller chain 112 is rotationally coupled to first and second spaced sprockets 140, 142 arranged to rotate about parallel axes. As will be appreciated by persons of ordinary skill in the art, the sprockets 140, 142 may be coupled to a motor (e.g., electric motor) so that in use, the motor drives or rotates the first and second sprockets 140, 142 in the same direction (and at the same speed in the sprockets have the same diameter), which in turn rotates the roller chain 112 in the same direction as the direction of rotation of the sprockets. As installed on the first and second sprockets 140, 142, the roller chain 112 may assume a generally oval shape with parallel sides, although other shapes are contemplated. In addition, although the illustrated embodiment includes a pair of sprockets, it is contemplated that more than two sprockets could be used without departing from the scope of the disclosure. The important point is that the gripping assemblies should be in contact more than tangentially and, preferably, along as long a linear path as is practical to maximize the wire pulling force.

As shown, the first gripper assembly 110 may rotate in the clockwise direction CW while the second gripper assembly 112 may rotate in the counter-clockwise direction CCW. However, it should be appreciated that this is entirely optional, and the first gripper assembly 110 may rotate in the counter-clockwise direction CCW while the second gripper assembly 112 may rotate in the clockwise direction CCW. In addition, while the motor has been described as rotating both the first and second sprockets 140, 142, it is contemplated that the motor may only rotate one of the first and second sprockets, leaving the other sprocket to freewheel and be driven by chain 112.

The first gripper assembly 110 may also incorporate one or more supports 150 for supporting the roller chain 112 in the area in-between the sprockets 140, 142 and to assist the individual chain links 114 in coming together as the roller chain 112 rotates with the sprockets 140, 142. The wire feeder device 100 may further incorporate a chain tensioner 160 to maintain the tension in the roller chain 112.

Figure 3:
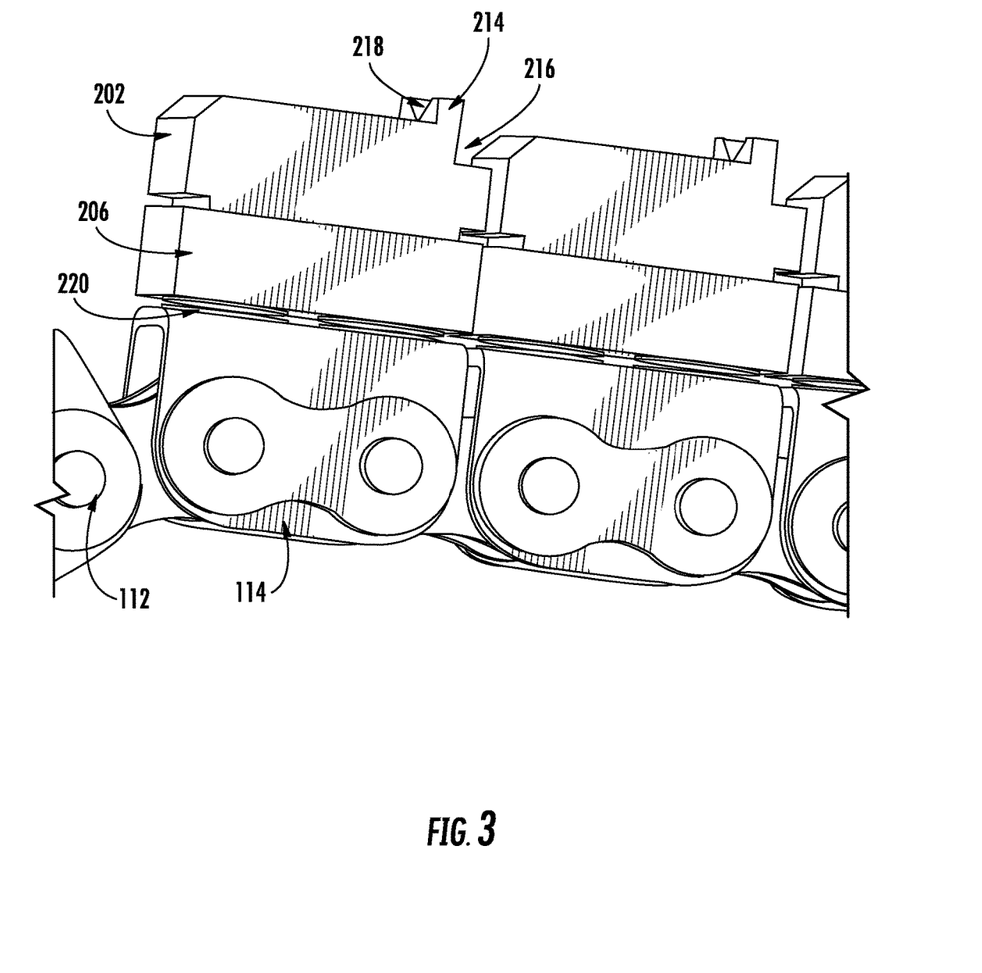
FIG. 3 is a detail view of an exemplary gripper member used in connection with the wire feeder device shown in FIG. 2.
Figure 4A:
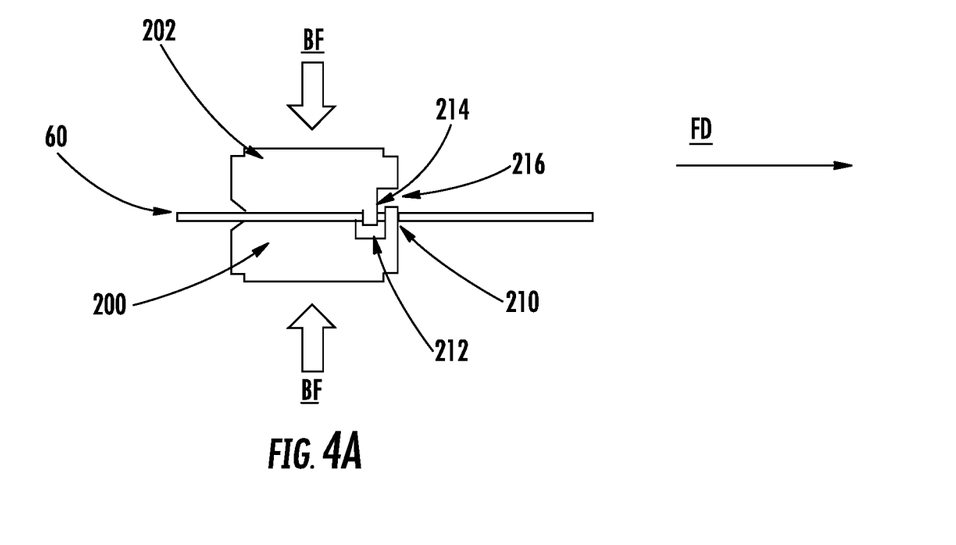
FIG. 4A is a side view of an exemplary gripper member assembly having first and second gripper members used in connection with the wire feeder device shown in FIG. 2, the first and second gripper members being orientated to apply a vertical pressure to a welding wire.
Figure 4B:
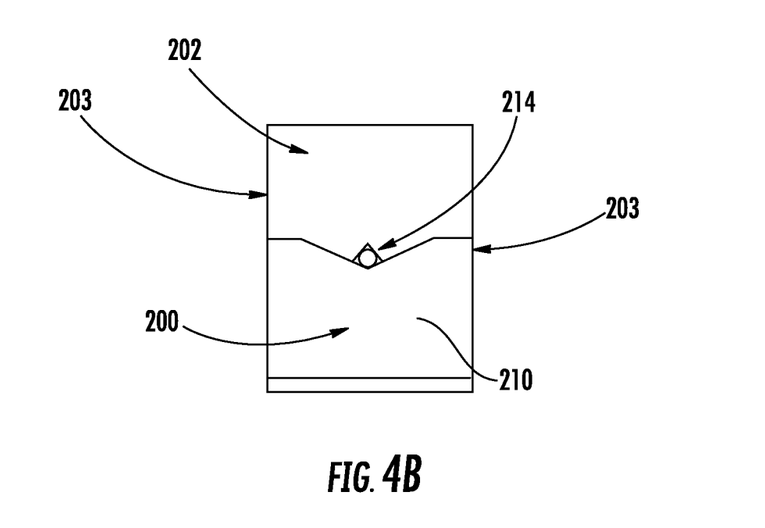
FIG. 4B is a front view of the exemplary gripper member assembly shown in FIG. 4A.
Figure 4C:
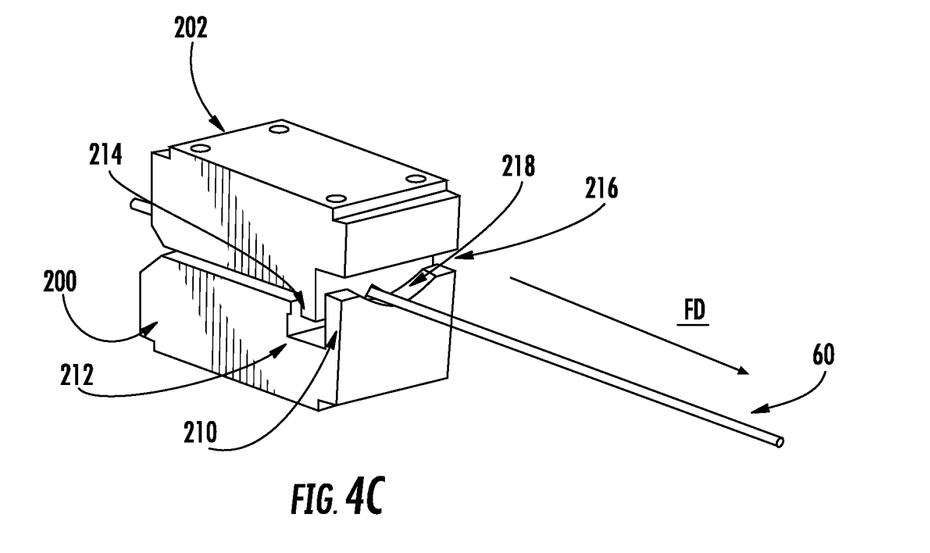
FIG. 4C is a front, perspective view of the exemplary gripper member assembly shown in FIG. 4A, the gripper member assembly shown in a closed position.
Figure 4D:
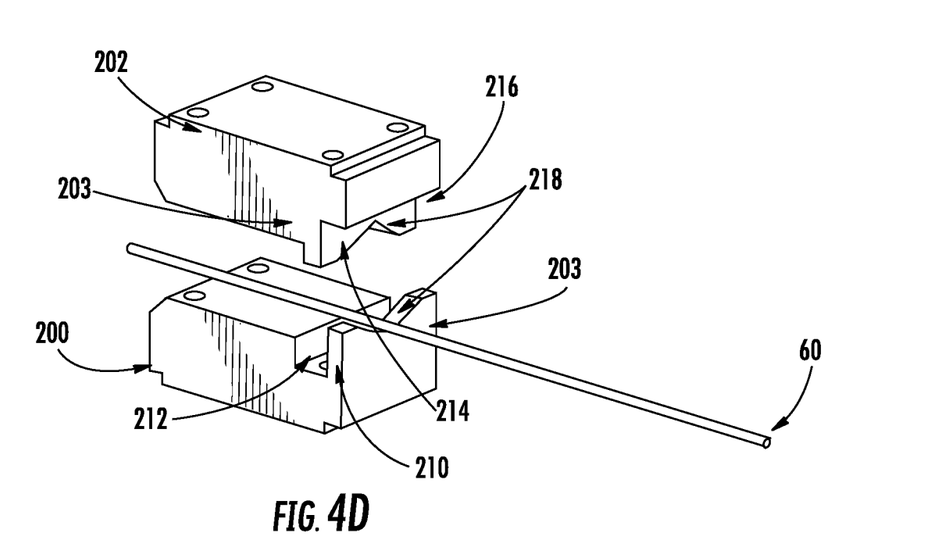
FIG. 4D is a perspective view of the exemplary gripper member assembly shown in FIG. 4A, the gripper member assembly shown in an open position.

Referring to FIGS. 3-4D, the wire feeder device 100 may include first and second opposing gripper members 200, 202. In use, the first gripper member 200 may be coupled to the first gripper assembly 110, while the second gripper member 202 may be coupled to the second gripper assembly 120, although it is contemplated that this arrangement could be reversed. A first gripper member 200 may be coupled to each of the links 114 of the first gripper assembly 110. Similarly, a second gripper member 202 may be coupled to each of the links 114 of the second gripper assembly 120.

In this manner, as the roller chain 112 of the first and second gripper assemblies 110, 120 rotates, the first and second gripper members 200, 202 may move from an open position, in which opposing first and second gripper members are spaced apart, to a closed position in which the first and second gripper members 200, 202 approach each other to thereby sandwich the welding wire 60 therebetween. In the closed position the welding wire 60 is gripped by opposing first and second gripper members 200, 202 so that it is fed in the feeding direction FD. That is, as the first and second gripper assemblies 110, 120 rotate about their respective sprockets 140, 142, successive sequential pairs of first and second gripper members 200, 202 receive the welding wire 60 adjacent the input end 62. As the first and second gripper assemblies 110, 120 continue to rotate, opposing first and second gripper members 200, 202 approach each other to clamp down onto the welding wire 60 disposed therebetween. As the first and second gripper assemblies 110, 120 continue to rotate, the first and second gripper members 200, 202 move in relatively linear manner along with the roller chains 112 of the first and second gripper assemblies 110, 120, and hence the first and second gripper members move, along with the welding wire 60 clamped therebetween, toward the output end 64.

By pulling the welding wire 60 along using the first and second gripper members 200, 202, which themselves are moving with the welding wire 60 in the feeding direction FD, "shaving" of the wire is substantially reduced or eliminated because there is no relative movement or slippage between the feeder mechanisms (e.g., the first and second gripper members 200, 202) and the welding wire 60.

As shown, the first and second gripper members 200, 202 have a length substantially corresponding to the length of each individual link 114. By using substantially rectangular shaped gripper members 200, 202, contact area between the gripper members 200, 202 and the welding wire 60 is maximized as compared to prior wire feeders in which contact area is limited to a mutual tangent of adjacent circular feed rolls. The increased contact area decreases the contact pressure on the welding wire 60 compared to the circular roller approach, which lowers the surface pressure on the welding wire and thus decreases the risk of deforming the welding wire. While the gripper members 200, 202 have been shown and described as having a substantially rectangular cross-sectional shape, virtually any other shape could be used including, but not limited to, square, trapezoidal, etc.

The first and second gripper members 200, 202 may include a built-in centering function to center the position of the welding wire 60 (i.e., to substantially align a centerline of the welding wire 60 with a centerline of the first and second gripper members 200, 202) to avoid the risk of the wire tangling and to assist with feeding the welding wire 60 through the welding device 50 without requiring a user to access the wire feeder device 100.

Referring to FIGS. 4A-4D, the first gripper member 200 may include an outwardly extending member or projection 210 extending therefrom and a cutout or recess 212 disposed directly adjacent the projection (collectively referred to herein as projection and cutout). The second gripper member 202 (as shown in FIGS. 3-4D) may include a similar projection 214 and cutout 216, though their positions are reversed. When the gripping members are engaged, projections 210 and 214 are longitudinally (i.e., along the length of wire 60) offset as shown in the drawings wherein projection 201 is forward of projection 214. In use, when the first and second gripper members 200, 202 are configured in the closed position, the projection 210 of the first gripper member 200 is sized and adapted to be received within the cutout 216 of the second gripper member 202, while the projection 214 of the second gripper member 202 is sized and adapted to be received within the cutout 212 of the first gripper member 200. The projections 210, 214 are received in the cutouts 212, 216 and engage the welding wire 60 therebetween.

To center the welding wire 60 between the first and second gripper members 200, 202, the projections 210, 214 of the first and second gripper members may also each include a notch 218 transversely centered in their distal edges for receiving and contacting the welding wire 60. The notches 218 may be defined at the nadir intersection of two laterally converging sides to cradle the welding wire between longitudinally offset but adjacent notches. Alternatively the notch may have a semi-circular shape that more closely conforms to the round shaped of the wire, although other shapes are contemplated. Thus, in some embodiments the projections 210, 214 may include sloped surfaces that angle laterally from a high point at or adjacent an outer side surface 203 of the gripping members 200, 202 to a lower point at or adjacent a centerline of the first and second gripper members 200, 202. As such, the sloped surfaces facilitate positioning the welding wire 60 towards the center of the first and second gripper members 200, 202. The combination of the sloped surfaces and notches 218 assist in centering the welding wire 60.

In use, the projections 210, 214, cutouts 212, 216 and notches 218 assist with centering the welding wire 60 with respect to the gripper members 200, 202, although any other centering mechanisms may be incorporated including, but not limited to, forming a longitudinal groove in one of the gripper members, etc. Incorporating the built-in centering function eliminates the need for a user to open the mechanism in order to thread the welding wire 60. It may also ensure that the wire does not wander laterally within the feeding mechanism during operation.

The first and second gripper members 200, 202 may be made from any suitable material. For example, the first and second gripper members 200, 202 may be made from a flexible material such as, for example, an elastomer, Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate (PET), Polyimides, Polyoxymethylene plastic (POM/Acetal), Polyphenylene sulfide (PPS), Polyphenylene oxide (PPO), Polysulphone (PSU), Polytetrafluoroethylene (PTFE/Teflon), aluminum alloys, etc.

By making the first and second gripper members 200, 202 from a flexible resilient material (i.e., one that is capable of deforming to conform itself to the shape of the welding wire), the same gripper members 200, 202 may be used with different diameter welding wire 60. That is, by making the first and second gripper members 200, 202 from a flexible resilient material, the first and second gripper members 200, 202 are able to better accommodate welding wires of various diameters thereby incorporating a level of built-in flexibility so that the same gripper members 200, 202 can accept welding wire 60 of different diameters and avoid having the user replace the gripper members 200, 202 every time a different diameter welding wire 60 is used.

In addition, referring to FIG. 3, the first and second gripper members 200, 202 may be coupled to each individual chain link 114 via one or more biasing members 220 for providing a biasing force away from the individual links 114. For example, as shown, the first and second gripper members 200, 202 may be coupled to the individual chain links 114 via a pair of springs 220 which bias the first and second gripper members 200, 202 away from the roller chain 112 and toward each other and hence toward the welding wire 60. Incorporation of the one or more biasing members 220 further assists the wire feeder device 100 in accommodating variable diameter welding wire 60 without having to replace or change the first and second gripper members 200, 202, and eliminates the need for a user to have to set the mechanism for a specific diameter of welding wire 60. That is, by incorporating one or more biasing members 220, the wire feeder device 100 is better able to accommodate welding wire 60 having various diameters. In addition, by incorporating one or more biasing members 220, the wire feeder device 100 is better able to provide increased grip pressure as generally needed for larger diameter welding wire. The first and second gripper members 200, 202 may be coupled to the biasing member 220 either directly, or indirectly via an intermediate member 206.

As described, the wire feeder device 100 can feed (e.g., move) the welding wire 60 from the input end 62 to the output end 64 through rotation of the sprockets 140, 142 and attendant movement of the individual gripper members 200, 202. The contact pressure applied by the gripper members 200, 202 to the welding wire 60 can be controlled by controlling the spacing distance between the rotating sprockets 140, 142 and the flexibility of the gripper members 200, 202, as well as by controlling the spring constant of the one or more biasing members 220 coupling the gripper members 200, 202 to the individual chain links 114. In some embodiments, the roller chain 112 may be supported in a manner that maintains a consistent desired pressure on the welding wire 60 by ensuring that a constant distance is maintained between the roller chains 112.

In some embodiments, the welding wire 60 is centered by the corresponding shapes of the opposing gripper members 200, 202, such as by incorporating corresponding projections 210, 214, cutouts 212, 216 and notches 218. As a result, the welding wire 60 may be fed through the wire feeding device 100 by inserting the welding wire 60 into the input end 62. The welding wire 60 may be automatically centered and drawn between the opposing gripper members 200, 202 such that opening and accessing the wire feeding device 100 is not required.

By utilizing larger gripper members 200, 202, and by feeding the welding wire 60 by pulling it with the gripper members as they move in the feeding direction FD, a larger contact surface area between the welding wire 60 and the wire feeder device 100 may be created, resulting in decreased required contact pressure on the welding wire 60. This lower surface pressure decreases the risk of deforming the welding wire 60. In addition, as there is no relative movement or slippage between the gripper members 200, 202 and the welding wire 60 being fed, the disclosed arrangement substantially eliminates any risk of "shaving" of the welding wire.

Referring now to FIGS. 5 through 7B, an alternate exemplary embodiment of a wire feeder device 500 for use in a welding device 50 for contacting and feeding (e.g., moving) the welding wire 60 in accordance with the present disclosure is shown. The wire feeder device 500 of this embodiment is similar in operation to the wire feeder device 100 previously described except as described herein. However, instead of two gripping assemblies being coplanar or vertically adjacent as in feeder device 100, in device 500 the single gripping assembly has two sets of laterally adjacent gripping members that engage laterally rather than vertically.

Figure 5:
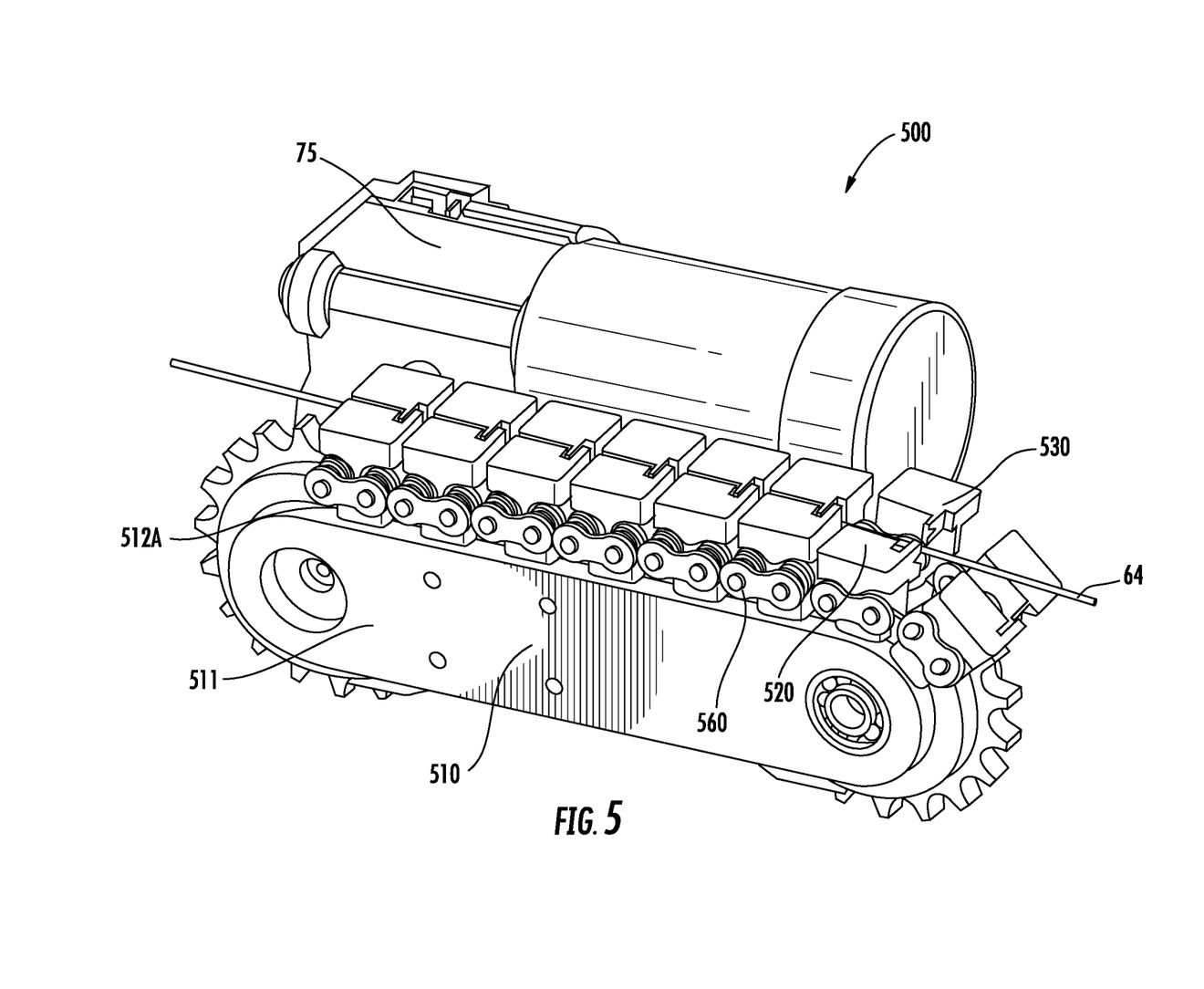
FIG. 5 is a side, perspective view of an alternate exemplary wire feeder device according to the present disclosure.
Figure 6:
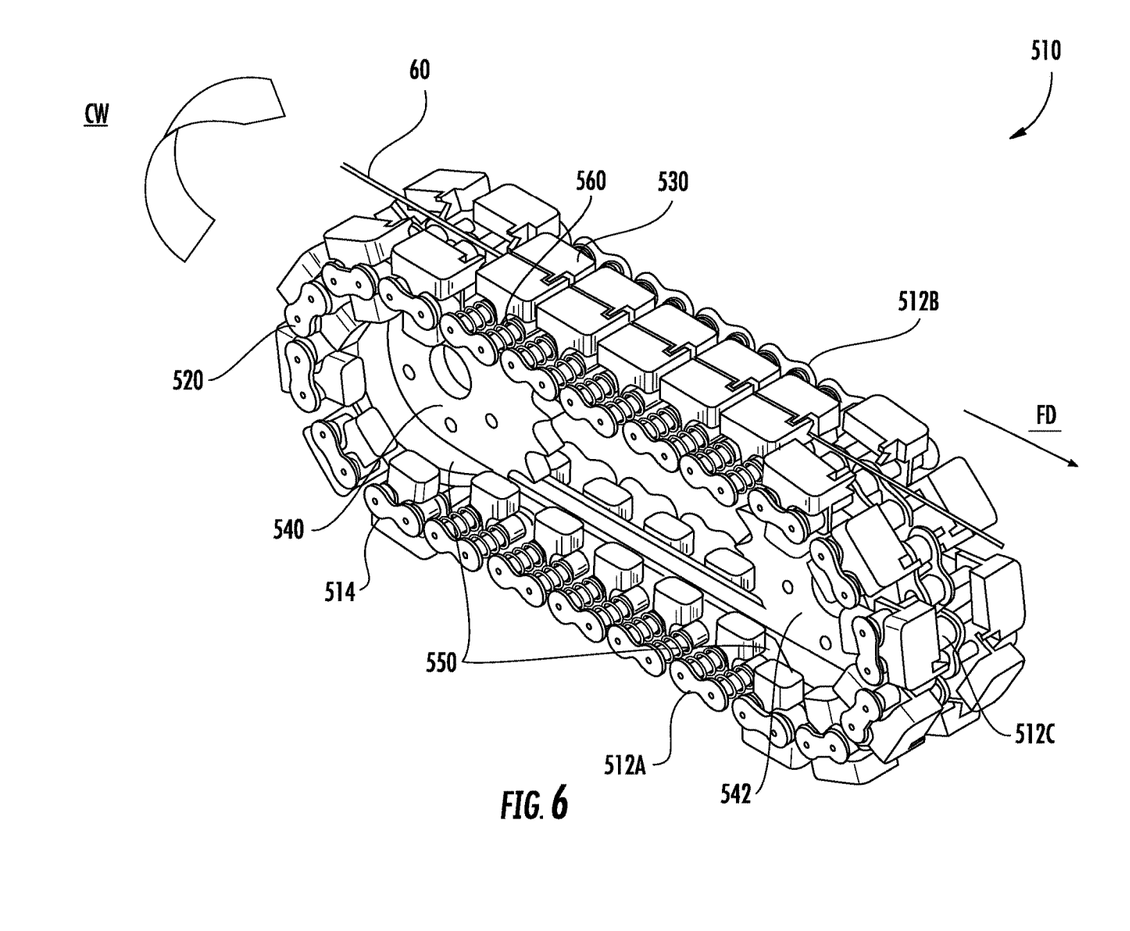
FIG. 6 is an alternate perspective view of an exemplary gripper assembly for use in the wire feeder device of FIG. 5.

More specifically, the wire feeder device 500 may include a single gripper assembly 510 for contacting and feeding the welding wire 60 in a feeding direction FD (FIG. 6). The gripper assembly 510 may include a roller chain 512 associated with first and second sprockets 540, 542 so that rotation of the sprockets 540, 542 rotates the roller chain 512, which in turn causes first and second lateral gripper members 520, 530 to move laterally from an open position (FIG. 7A) to a closed position (FIG. 7B), and eventually from the closed position back to the open position, so that the first and second lateral gripper members 520, 530 may come into and out of contact with a welding wire 60 disposed therebetween. That is, as the roller chain 512 rotates (e.g., via a motor 75, which rotates first and second sprockets 540, 542), for example, in the clockwise direction, the first and second lateral gripper members 520, 530 move from an open position (in which the first and second lateral gripper members 520, 530 are spaced laterally apart from one another) to a closed position (in which the first and second lateral gripper members come into contact with the welding wire 60 located therebetween). As can best be seen in FIG. 6, the first and second lateral gripper members 520, 530 are configured in the open position adjacent the input end 62, and move from the open position to the closed position when in the central portion of the wire feeder device 500. As they near the output end 64 the first and second lateral gripper members 520, 530 come out of contact with one another (again assuming the open position), and release the welding wire 60, adjacent the output end 64. In this manner, the gripper members 520, 530 laterally grip the welding wire 60 therebetween and because the first and second gripper members 520, 530 are coupled to the rotating roller chain 512 of the gripper assembly 510, the welding wire 60 is fed (e.g., moved) from the input end 62 to the output end 64 of the welding device 500.

Thus, as arranged, movement of the gripper assemblies 510 causes the welding wire 60 to be gripped between the first and second lateral engaging gripper members 520, 530, and the first and second gripper members 520, 530 and the welding wire move in the feed direction FD. By utilizing a single gripper assembly 510 with laterally contacting gripper members 520, 530 the wire feeder device 500 minimizes the number of parts required and hence saves space.

The gripper assembly 510 may include a roller chain, an endless track belt, a belt, or the like (collectively referred to herein as a roller chain 512). As shown, the roller chain 512 may be formed from a plurality of individual chain links 514 coupled together to form a chain. In use, the roller chain 512 may be coupled to first and second sprockets 540, 542 so that as the sprockets rotate, roller chain 512 is moved in a corresponding direction. As will be appreciated by one of ordinary skill in the art, the sprockets 540, 542 may be coupled to a motor 75 (e.g., electric motor) so that in use, the motor drives or rotates the first and second sprockets 540, 542, which in turn rotates the roller chain 512, and the first and second gripper members 520, 530. The gripper assembly 510 may assume a generally oval shape, although other shapes are contemplated. In addition, although the illustrated embodiment includes a pair of sprockets, it is contemplated that more than two sprockets could be used without departing from the scope of the disclosure.

As shown, the gripper assembly 510 may rotate in the clockwise direction CW. However, it should be appreciated that this is entirely optionally and that the gripper assembly 510 may rotate in the counter-clockwise direction CCW. In addition, while the motor 75 has been described as rotating both the first and second sprockets 540, 542, it is contemplated that the motor 75 may only rotate one of the first and second sprockets, leaving the other sprocket to freewheel.

The wire feeder device 500 may also include first and second gripper members 520, 530 that are associated with the roller chain 512. The first and second gripper members 520, 530 being arranged in a side by side relationship.

As shown, the first and second gripper members 520, 530 are arranged in a lateral, side by side relationship so that rotation of the roller chains 512 causes the first and second gripper members 520, 530 to move from an open position (in which the first and second gripper members 520, 530 are spaced apart) to a closed position so that the first and second gripper members 520, 530 laterally approach each other to sandwich the welding wire 60 therebetween. As such, the welding wire 60 is gripped and fed in the feeding direction FD. That is, as the roller chains 512 rotates, the first and second gripper members 520, 530 move from the open position adjacent the input end 62 to the closed position (adjacent the central portion of the wire feeder device 500) to receive the welding wire 60 and clamp it therebetween. As the roller chain 512 continues to rotate, the first and second gripper members 520, 530 move along with the roller chain 512 clamped therebetween, and hence the first and second gripper members move the welding wire 60 toward the output end 64. By pulling the welding wire 60 along using the first and second gripper members 520, 530, which themselves are moving along with the welding wire 60 in the feeding direction FD, "shaving" of the wire is substantially reduced or eliminated because there is no relative movement or slippage between the feeder mechanisms (e.g., the gripper assembly 510) and the welding wire 60.

The gripper assembly 510 may also include a guide rail, cam, bracket, etc. 550 (collectively "guide device") at or before the input end 62 and the output end 64 that together cause the first and second gripper members 520, 530 to laterally open (e.g., move from the closed position to the open position) so that the welding wire 60 may be received and released, respectively, with respect to the first and second gripper members 520, 530. As best shown in FIG. 6, which illustrates the gripper assembly 510 with a cover 511 removed, the guide device 550 may be in the form of a sloped ram that contacts the first and second gripper members 520, 530 as they are rotated, causing the first and second gripper members 520, 530 to separate (e.g., spread apart, separate, etc.). As shown, the gripper assembly 510 may include guide devices 550 on either side of the first and second sprockets 540, 542.

Figure 7A:
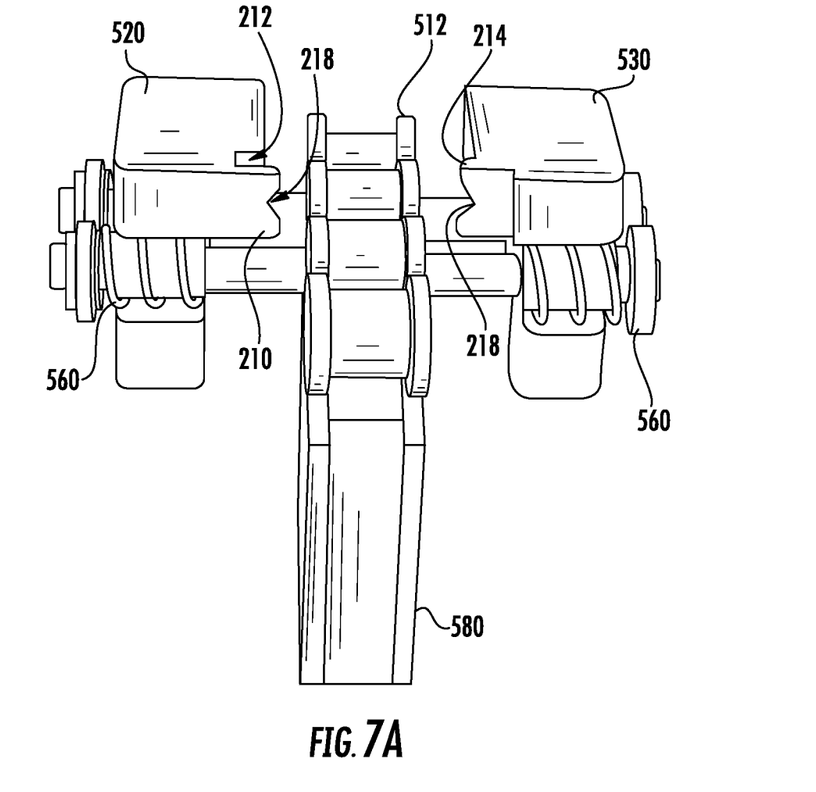
FIG. 7A is a perspective view of the gripper assembly shown in FIG. 6 in an opened position.
Figure 7B:
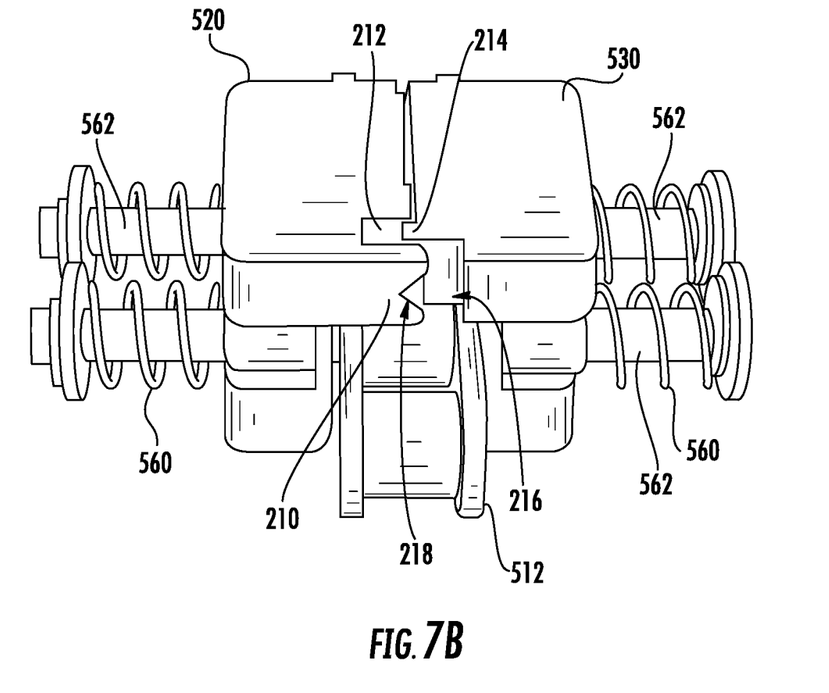
FIG. 7B is a perspective view of the gripper assembly shown in FIG. 6 in a closed position.

Referring to FIGS. 7A and 7B, the first and second gripper members 520, 530 may include a plurality of biasing members 560, such as, for example, springs, to bias the first and second gripper members 520, 530 into contact with one another and thus into contact with the welding wire 60 located therebetween (e.g., to bias the first and second gripper members 520, 530 from the open position to the closed position). In use, the biasing members 560 may be orientated about one or more rods 562 associated with the first and second gripper members 520, 530 to bias the first and second gripper members 520, 530 to the closed position. As such, in use, as soon as the first and second gripper members 520, 530 rotate beyond the guide devices 550, the biasing member 560 causes the first and second gripper members 520, 530 to close. In use, the guide device 550 may extend to a sufficient distance so that when the guide devices 550 stop, the welding wire 60 is located in-between the first and second gripper members 520, 530.

Alternatively, it is envisioned that the plurality of biasing members 560 may be used to bias the first and second gripper members 520, 530 to the opened position and that a cam or other similar device may be used to move the first and second gripper members 520, 530 to the closed position.

Incorporation of the biasing member 560 also assists the wire feeder device 500 in accommodating variable diameter welding wire 60 without having to replace the gripper members 520, 530 and also eliminates the need for a user to adjust the device to accommodate a specific diameter of welding wire 60. In addition, by incorporating one or more biasing members 560, the wire feeder device 500 is better able to provide increased grip pressure as generally needed for lager diameter welding wire.

The first and second gripper members 520, 530 may be substantially similar to the first and second gripper members 200, 202 previously described in that, similar to the gripper members 200, 202, the first and second gripper members 520, 530 may have a length substantially corresponding to the length of each individual link 514. By using substantially rectangular shaped gripper members 520, 530, the contact area between the gripper members 520, 530 and the welding wire 60 can be maximized, which in turn may decrease the contact pressure on the welding wire 60. Decreased contact pressure reduces the likelihood that the welding wire 60 will be deformed or damages in some way. While the gripper members 520, 530 have been shown and described as having a substantially rectangular shape, virtually any other shape could be used including, but not limited to, square, trapezoidal, etc.

In addition, the first and second gripper members 520, 530 may include a built-in centering function to center the position of the welding wire 60 (e.g., to substantially align a centerline of the welding wire 60 with a centerline of the first and second gripper members 520, 530) to avoid the risk of tangling and to assist with feeding the welding wire 60 through the wire feeder device 500 without having a user accessing the wire feeder device 500. That is, as previously described, the first gripper member 520 may include a projection 210 extending therefrom and a cutout 212. The second gripper member 530 may include a similar projection 214 and cutout 216. In use, the projection 210 of the first gripper member 520 is sized and adapted to be received within the cutout 216 of the second gripper member 530, while the projection 214 of the second gripper member 530 is sized and adapted to be received within the cutout 212 of the first gripper member 520. The projections 210, 214 interconnect with the cutouts 212, 216 to receive the welding wire 60 therebetween. The projections 210, 214 may also include a notch 218 at the tip thereof for receiving and contacting the welding wire 60. The notch 218 may include a semi-circular shape, although other shapes are envisioned. The projections 210, 214 may include a sloped surface that angles from a high point at or adjacent an outer side surface 203 thereof to a lower point at or adjacent a centerline of the first and second gripper members 520, 530. As such, the sloped surface facilitates positioning the welding wire 60 towards the center of the first and second gripper members 520, 530. The combination of the sloped surfaces and notches 218 assist centering the welding wire 60.

In use, the projections 210, 214, cutouts 212, 216, and notch 218 assist with centering the welding wire 60 with respect to the gripper members 520, 530, although any other centering mechanisms may be incorporated including, but not limited to, forming a longitudinal groove in one or more of the gripper members, etc. Incorporating the built-in centering function eliminates the need for a user to open the mechanism in order to thread the welding wire 60.

As previously described, the first and second gripper members 520, 530 may be made from any suitable material. For example, the first and second gripper members 520, 530 may be made from a flexible material such as, for example, an elastomer, or any of the other as mentioned materials. By making the first and second gripper members 520, 530 from a flexible material (i.e., one that is capable of deforming to conform itself to the shape of the welding wire), the same gripper members 520, 530 can be used with different diameter welding wires 60. That is, by making the first and second gripper members 520, 530 from a flexible material, the first and second gripper members 520, 530 are able to better accommodate welding wires of various diameters thereby incorporating a level of built-in flexibility so that the same gripper members 520, 530 can accept welding wire 60 of different diameters and avoid having the user replace the gripper members 520, 530 every time a different diameter welding wire 60 is used.

The gripper assembly 510 may also incorporate one or more supports 580 for supporting the roller chain 512 in the area in-between the sprockets 540, 542.

The wire feeder device 500 may also incorporate a chain tensioner to maintain the tension in the roller chain 512.

According to the wire feeder device 500 of the present disclosure, in use, feeding the welding wire 60 is created by rotation of the sprockets 540, 542 via the motor 75. The contact pressure to the welding wire 60 is applied by the flexibility of the gripper members 520, 530 to adapt to various diameters of the welding wire 60.

The welding wire 60 is also centered by the corresponding shapes of the gripper members 520, 530 (e.g., incorporation of corresponding projections 210, 214, cutouts 212, 216 and notches 218). As a result, the welding wire 60 made be fed through the wire feeding device 500 by inserting the welding wire 60 into the input end 62. The welding wire 60 may be automatically centered and drawn between the opposing gripper members 520, 530 such that opening and accessing the wire feeding device 500 is not required.

By utilizing larger gripper members 520, 530, and by feeding the welding wire 60 by pulling it with gripper members 520, 530 as they move in the feeding direction FD, a larger contact surface area between the welding wire 60 and the wire feeder device 500 may be created, resulting in decreased contact pressure on the welding wire 60. This lower surface pressure decreases the risk of deforming the welding wire 60. In addition, as there is no relative movement or slippage between the gripper members 520, 530 and the welding wire 60 being feed, the disclosed arrangement substantially eliminates any risk of "shaving" of the welding wire.

As noted above, since the projection of each gripper member is received in the cutout of the other gripper member, the notches formed in first and second gripper members are longitudinally offset such that they contact the welding wire at different but longitudinally adjacent points along the wire. This offset minimizes compression and potential distortion of the welding wire.

In addition to the described structural aspects of the present invention, a method of feeding welding wire according to the present invention comprises the steps of: positioning first and second sequentially arranged endless loops of gripping members in close adjacency such that the gripping members of the first loop engage the gripping members of the second loop in a substantially linear path along portions of the lengths of the loops; disposing and laterally centering the welding wire between said loops of gripping members such that lateral movement of the welding wire is prevented by the engaged gripping members; rotating the loops such that different length sections of each loop sequentially come into engagement and move the welding wire along said substantially linear path. In addition, the method includes threading the welding wire between the gripping members by starting rotation of the loops and pushing the wire between the moving gripping members without separating the loops of gripping members. The step of centering is achieved by the inherent structure of the gripping members.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. In addition, for the sake of convenience and clarity, terms such as "front", "rear", "top", "bottom", "upper", "lower", "vertical", "horizontal", "lateral", "longitudinal", "transverse", "height", and "width" may have been used herein to describe the relative placement and orientation of the device and its various components, each with respect to the geometry and orientation of the device as it appears in the figures. These orientation and placement descriptors are used for convenience in describing the embodiments and are not intended to be limiting on the scope of the invention unless otherwise apparent in the claims.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A wire feeder device for feeding a welding wire in a feeding direction from an input end to an output end comprising:
   at least one gripper assembly for contacting and feeding the welding wire, the gripper assembly including a roller chain; and first and second sprockets operatively coupled to the roller chain so that rotation of the first and second sprockets causes the roller chain to rotate; and
   a plurality of first and second gripper members on the roller chain, the first and second gripper members being movable from an open position to a closed position to contact and grip the welding wire, the first and second gripper members being longitudinally movable with the roller chain so that the welding wire is moved from the input end to the output end;
   wherein the first and second gripper members include a centering feature to center a position of the welding wire substantially parallel with a longitudinal axis of the first and second gripper members; and
   wherein the first and second gripper members each include a projection and a cutout, the projection of the first gripper member being receivable within the cutout of the second gripper member; the projection of the second gripper member being receivable within the cutout of the first gripper member.

2. The wire feeder of claim 1, wherein the projections have a transversely centered notch defined therein in their distal edges at a nadir intersection between two laterally converging sides.

3. The wire feeder of claim 2 wherein the projections of said first and second position members are longitudinally offset such that they contact the welding wire at different but longitudinally adjacent points along the wire to minimize compression and potential distortion of the welding wire.

4. The wire feeder of claim 1, wherein each of the projections includes a notch for contacting an outer surface of the welding wire.

5. The wire feeder of claim 4, wherein the notch has a semi-circular shape.

6. The wire feeder of claim 1, wherein the first and second gripper members are made from a resilient flexible material.

7. The wire feeder of claim 1, wherein each gripper member includes a biasing member for biasing the first and second gripper members to the closed position.

8. The wire feeder of claim 1, wherein the roller chain comprises a plurality of individual chain links coupled to one another.

9. The wire feeder of claim 8, wherein each of the plurality of first and second gripper members has a length substantially corresponding to the length of an individual chain link to provide an increased contact area between the first and second gripper members and the welding wire.

10. The wire feeder of claim 1, wherein rotation of the roller chain causes the first and second gripper members to move from the open position to the closed position, and subsequently from the closed position to the open position.

11. The wire feeder of claim 1, wherein moving the first and second gripper members from the open position to the closed position causes the first and second gripper members to grip the welding wire therebetween so that the welding wire is movable from the input end to the output end.

12. The wire feeder of claim 1, wherein the first and second gripper members each include a biasing member for supplying a biasing force away from each individual link coupled thereto.

13. A wire feeder device for feeding a welding wire in a feeding direction from an input end to an output end comprising:

at least one gripper assembly for contacting and feeding the welding wire, the gripper assembly including a roller chain; and first and second sprockets operatively coupled to the roller chain so that rotation of the first and second sprockets causes the roller chain to rotate; and a plurality of first and second gripper members, the first and second gripper members being movable from an open position to a closed position to contact and grip the welding wire, the first and second gripper members being longitudinally movable with the roller chain so that the welding wire is moved from the input end to the output end;

wherein the at least one gripper assembly is a single gripper assembly, the roller chain including a plurality of individual chain links coupled to one another to form a chain, each individual link of the roller chain being associated with one of the plurality of first gripper members and one of the plurality of second gripper members, the first and second gripper members being orientated in a side-by-side relationship on each individual link.

14. The wire feeder of claim 13, wherein rotation of the roller chain causes the first and second gripper members to move from the open position to the closed position, and subsequently from the closed position to the open position.

15. The wire feeder of claim 14, wherein:

moving the first and second gripper members from the open position to the closed position causes the first and second gripper members to grip the welding wire therebetween, the first and second gripper members moving from the open position to the closed position adjacent the input end;

moving the first and second gripper members from the closed position to the open position causes the first and second gripper members to disengage from the welding wire, the first and second gripper members moving from the closed position to the open position adjacent the output end.

16. The wire feeder of claim 15, wherein the gripper assembly includes a guide device for moving the first and second gripper members from the closed position to the open position.

17. The wire feeder of claim 16, wherein the first and second gripper members include a biasing member for moving the first and second gripper members from the open position to the closed position.

18. The wire feeder of claim 13:

wherein the first and second gripper members each include a projection and a cutout, the projection of the first gripper member being receivable within the cutout of the second gripper member; the projection of the second gripper member being receivable within the cutout of the first gripper member;

wherein the projections have a transversely centered notch defined therein in; and wherein the projections of said first and second position members are longitudinally offset such that they contact the welding wire at different but longitudinally adjacent points along the wire to minimize compression and potential distortion of the welding wire.

\* \* \* \* \*